United States Patent
Sergoyan et al.

(10) Patent No.: US 7,543,536 B2
(45) Date of Patent: Jun. 9, 2009

(54) APPARATUS FOR TRANSPORTING AND POSITIONING AN INSPECTION DEVICE WITHIN A WALLED CAVITY

(75) Inventors: Edward G. Sergoyan, Mukilteo, WA (US); G. Dale Davis, Marysville, WA (US); Ronald D. Curl, Lynnwood, WA (US)

(73) Assignee: The Boeing Company, Chicago, IL (US)

(*) Notice: Subject to any disclaimer, the term of this patent is extended or adjusted under 35 U.S.C. 154(b) by 226 days.

(21) Appl. No.: 11/590,258

(22) Filed: Oct. 31, 2006

(65) Prior Publication Data

US 2008/0098834 A1 May 1, 2008

(51) Int. Cl.
*B61B 13/10* (2006.01)
(52) U.S. Cl. .................... 104/138.1; 104/138.2
(58) Field of Classification Search ............. 104/138.1, 104/138.2; 73/866.5
See application file for complete search history.

(56) References Cited

U.S. PATENT DOCUMENTS

| | | | | |
|---|---|---|---|---|
| 2,742,259 A | * | 4/1956 | Boucher | 254/134.5 |
| 3,718,978 A | * | 3/1973 | Van Koevering et al. | 33/544 |
| 3,794,340 A | * | 2/1974 | Tartabini et al. | 280/15 |
| 4,369,713 A | * | 1/1983 | Richardson | 104/138.2 |
| 4,458,601 A | * | 7/1984 | Braithwaite et al. | 104/138.2 |
| 4,526,106 A | * | 7/1985 | Okada et al. | 104/138.2 |
| 4,537,136 A | * | 8/1985 | Douglas | 104/138.2 |
| 4,852,391 A | * | 8/1989 | Ruch et al. | 73/40.5 R |
| 4,862,808 A | * | 9/1989 | Hedgcoxe et al. | 104/138.2 |
| 5,203,646 A | * | 4/1993 | Landsberger et al. | 405/191 |
| 5,375,530 A | * | 12/1994 | Zollinger et al. | 104/138.2 |
| 6,339,993 B1 | * | 1/2002 | Comello et al. | 104/138.2 |
| 6,427,602 B1 | * | 8/2002 | Hovis et al. | 104/138.1 |
| 2006/0230846 A1 | * | 10/2006 | Smith et al. | 73/866.5 |
| 2006/0248966 A1 | * | 11/2006 | Houldey et al. | 73/865.8 |
| 2008/0092672 A1 | * | 4/2008 | Gibson et al. | 73/865.8 |
| 2008/0098834 A1 | * | 5/2008 | Sergoyan et al. | 73/866.5 |

* cited by examiner

*Primary Examiner*—S. Joseph Morano
*Assistant Examiner*—Jason C Smith
(74) *Attorney, Agent, or Firm*—Tung & Associates (57) ABSTRACT

A remotely controlled, traction wheel driven, transporter moves inspection equipment within a walled cavity to check internal structural features. The inspection equipment can be mounted on a positioner pushed by the transporter, which adjusts with changing dimensions of the cavity so as to maintain the inspection equipment in a desired position or attitude, for example, centered within the cavity.

33 Claims, 6 Drawing Sheets

APPARATUS FOR TRANSPORTING AND POSITIONING AN INSPECTION DEVICE WITHIN A WALLED CAVITY

BACKGROUND OF THE INVENTION

1. Field of the Invention

This invention broadly relates to inspection devices and related fixtures, and deals more particularly with an apparatus for transporting and positioning an inspection device within a walled cavity, such as inside an aircraft wing.

2. Description of the Related Art

A wide variety of new technologies are now employed to detect defects and measure or verify structural features within closed volumes or cavities in large and bulky manufactured items. For example, aircraft wings may be constructed using multi-spar internal boxes formed of co-cured composite materials. These wing boxes have walls defining long cavities which may be 40 or more feet in length. In some cases, the cross section of the cavity may change in dimensions and/or directions along its length. For example, the cavity within a horizontal stabilizer box may taper from approximately 2 feet in cross section to 6 or 7 inches over a 40 foot length.

In the context of the aircraft industry, features of a stabilizer box requiring inspection or verification include internal dimensions, the position of radius corners, the location of holes used for fasteners and similar structural features that are critical for quality or assembly. In order to inspect and measure these features, verification technologies including cameras, laser line measurement, laser dot scanning, and other nondestructive inspection techniques are used.

A problem may arise, for example, in gaining access to locations within the horizontal stabilizer box along its length using the selected verification equipment. Gaining inspection access is compounded by the fact that it is often necessary to position the verification equipment within the stabilizer box cavity, and then maintain this position as the equipment is moved along the length of the cavity. For example, some measurement devices must be precisely positioned in the corners of the cavity along its length, while other measurement equipment such as a laser scanner and cameras need to be located at the center of the cavity, even when the cavity changes cross sectional dimensions along its length.

Transport mechanisms have been developed that are capable of carrying inspection equipment through a large cavity. For the most part, these cavities are well ordered geometries such as circular pipes or square tubes. However known mechanisms may be ineffective in centering or precisely positioning inspection equipment within a cavity that is not well ordered such as a tapering rectangle or rhombic geometry. Moreover, while known camera inspection systems are used to image features in remote areas within the cavity, these systems cannot accommodate drastic changes in cross sectional dimensions of the cavity as its length is traversed. Similarly, these prior inspection systems may not be able to move around partial barriers that may be encountered within the cavity, such as bulkheads or spars.

Accordingly, there is a need for a system for transporting and positioning inspection and measuring equipment within cavities that avoid the problem discussed above. The invention is directed towards satisfying this need.

BRIEF SUMMARY OF THE INVENTION

In accordance with one aspect of the invention, an apparatus is provided for remotely positioning an inspection device within a walled cavity, comprising a positioner for carrying the inspection device, and a transporter connected with the positioner for moving the positioner through the cavity. The positioner includes a central hub and a plurality of extendable arms pivotally connected to the hub for supporting and maintaining the hub in a central position within the cavity. Wall engaging members such as rollers are mounted on the ends of the arms to engage the cavity walls. Biasing means comprising a spring or pneumatic piston, urge the arms to pivot outwardly into engagement with the wall so as to support and maintain the central hub in a central position within the cavity. The inspection device may be carried on a central hub or any of the arms. The arms are arranged in pivotally connected pairs forming collapsible scissor mechanisms which extend or collapse diagonally within the cavity so as to accommodate changing cross sectional dimensions of the cavity. The central hub comprises a shaft and a pair of supports relatively slidable on the shaft. The scissors-like, extendable arms are pivotally connected to the supports such that sliding movement of the supports extends or collapses the arms within the cavity.

In accordance with another aspect of the invention, apparatus is provided for carrying an inspection device through a walled cavity, comprising a hub assembly; a plurality of arms pivotally mounted on the hub assembly for supporting the hub assembly in a central position within the cavity; rollers for engaging the cavity walls and allowing the apparatus to roll through the cavity; and biasing means for biasing the arms outwardly toward the walls so that the rollers maintain engagement with the walls.

In accordance with still another aspect of the invention apparatus is provided for moving an inspection device through a walled cavity. The apparatus comprises a central support; a plurality of extendable arm assemblies carried on the support for maintaining the support centered within the cavity, wherein each of the arm assemblies includes an outer end for engaging a cavity; and, biasing means for biasing the outer ends of the arms against the cavity walls. Each of the arm assemblies includes at least one roller for engaging and rolling along one wall of the cavity. The arm assemblies are arranged in a plurality of diagonal pairs forming scissors mechanisms which maintain the central support centered within the cavity while accommodating changes in cross sectional dimensions of the cavity.

The transporter and positioning system of the invention is advantageous in that inspection equipment can be precisely positioned within the cavity throughout its entire length, irrespective of changes in the cross sectional dimensions of the cavity or changes in the direction of the cavity. Inspection equipment can be mounted on the central support so as to remain centered within the cavity, or alternatively can be mounted on one of the extendable arms to perform inspection of corner features.

These and other features, aspects and advantages of the invention will become better understood with reference to the following drawings, description and claims.

DETAILED DESCRIPTION OF THE INVENTION

Figure 1:
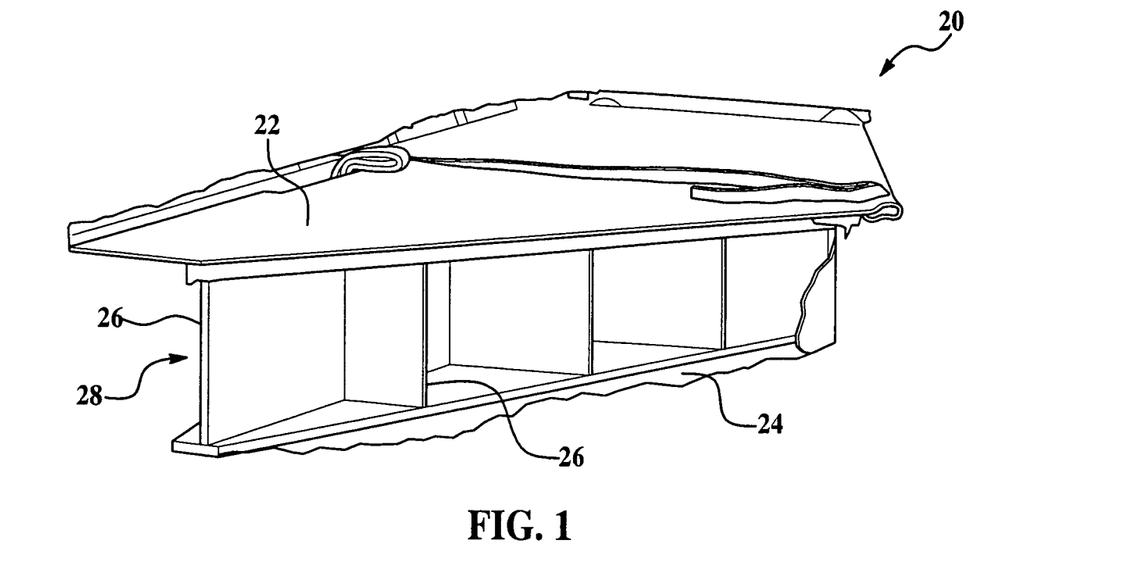
FIG. 1 is a perspective view showing one open end of a multi-spar box forming part of a horizontal stabilizer for an aircraft.
Figure 2:
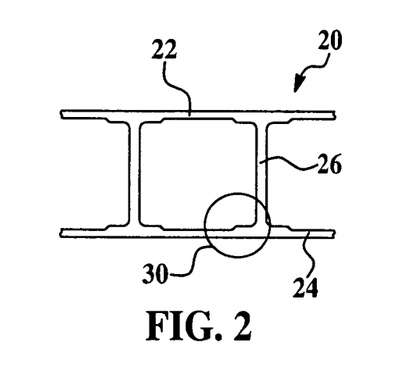
FIG. 2 is a fragmentary, cross sectional view of the multi-spar box show in FIG. 1, better depicting the profile of the internal box cavity.
Figure 3:
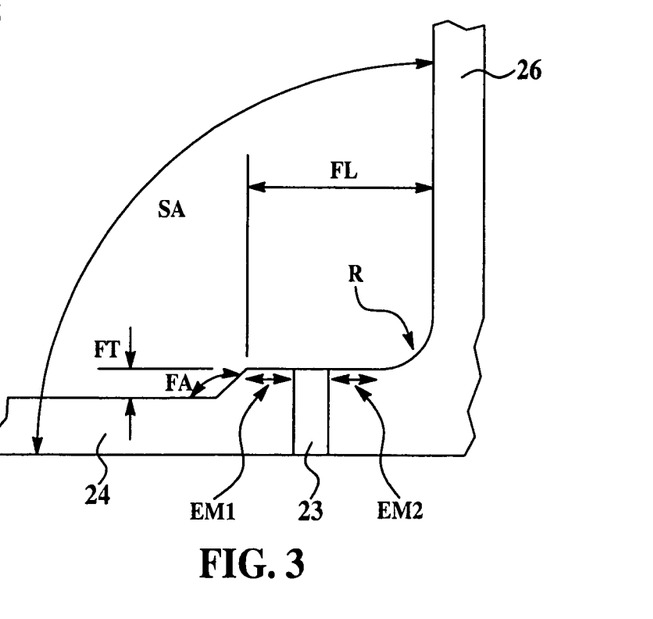
FIG. 3 is an enlarged, fragmentary view of the area designated by the numeral 30 in FIG. 2.

Referring first to FIGS. 1-3, the invention involves apparatus for transporting and positioning inspection equipment within walled cavities such as those found within a multi-spar stabilizer box 20 which forms part of a horizontal stabilizer for an aircraft. The multi-spar stabilizer box 20 may be formed from top and bottom walls 22, 24 respectively connected by a series of spaced apart side walls 26 which form a series of elongate cavities 28. The cavities 28 may taper in cross sectional dimension from the proximal end shown in FIG. 1 to smaller cross sectional dimensions at the distal end. In some constructions of the stabilizer box 20, the direction of the central axis of a cavity 28 may change at some point along its length.

As best seen in FIGS. 2 and 3, the cavity walls 22, 24, 26 may comprise co-cured composite materials that possess various internal structural features requiring inspection, verification or measurement. For example, as shown in FIG. 3, the corners 30 may typically include the following structural features which must be verified or measured:
R=radius
FL=flange length
FT=flange thickness
FA=flange angle
SA=spar angle
EM1=edge margin #1
EM2=edge margin #2

In addition, camera or other inspection equipment may need to verify the presence of a through-hole 23 which later receives a fastener (not shown). As used herein, "inspection" devices or equipment is intended to include various equipment and technologies intended to either verify, measure or inspect structural features within the cavity 28.

Figures 4, 5:
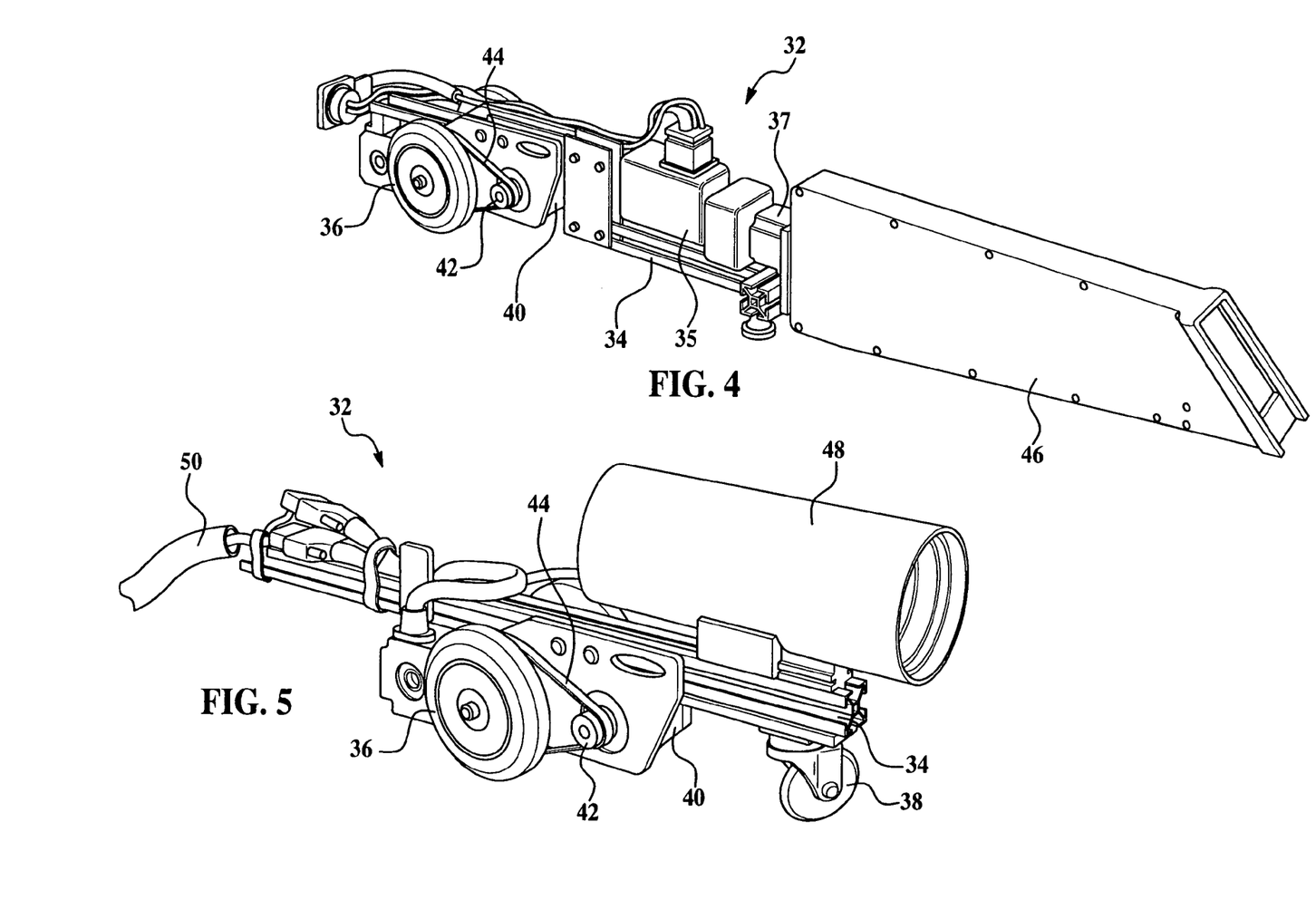
FIG. 4 is a perspective view of the transporter of the invention having a laser scanner mounted thereon.
FIG. 5 is a perspective view of the transporter having a camera mounted thereon.
Figures 6, 7:
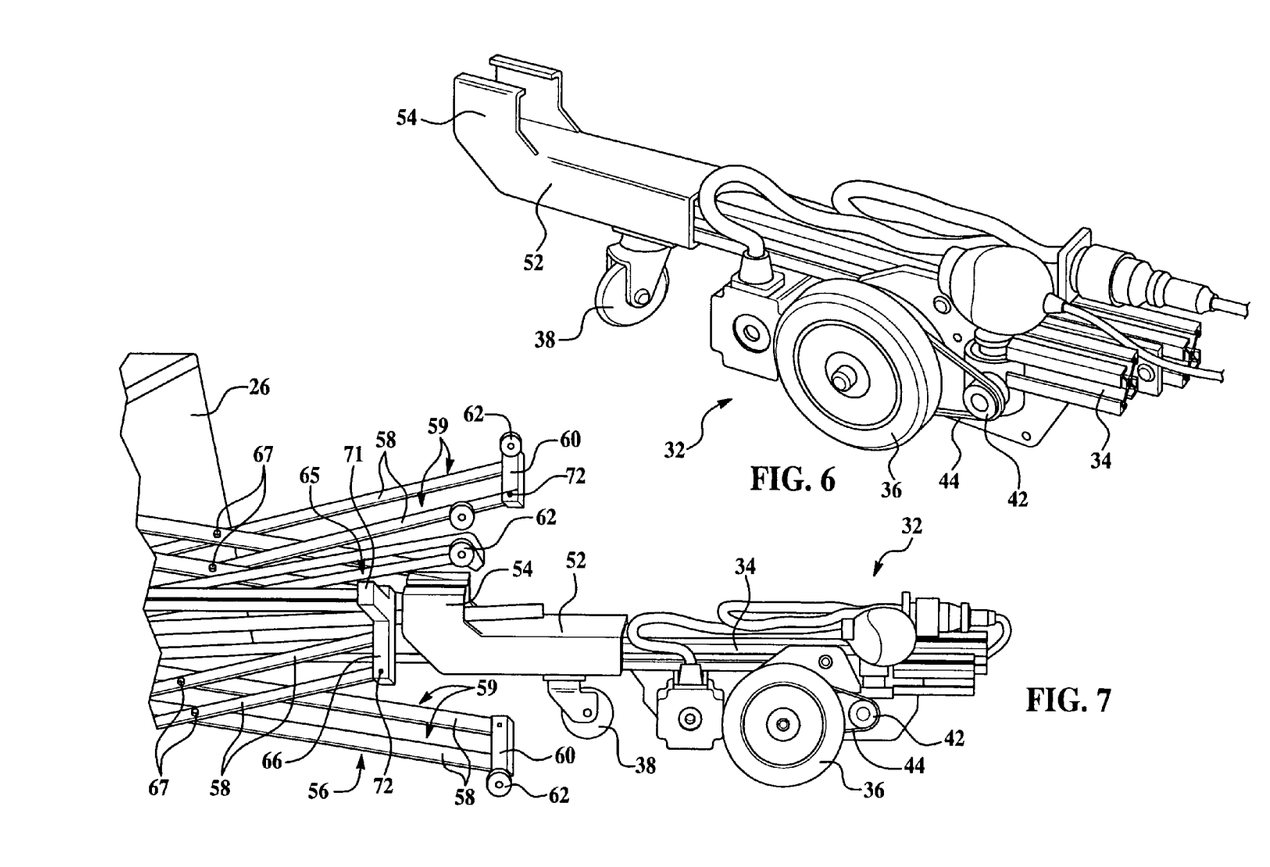
FIG. 6 is a perspective view of the transporter having a hitch used to connect the transporter with the positioner.
FIG. 7 is a perspective view of the transporter, shown pushing the positioner into a cavity of the multi-spar box shown in FIG. 1.

Referring now to FIG. 4-6, the invention includes a transporter 32 having an elongate frame 34 on which there is mounted a pair of driven traction wheels 36, and a single, forward wheel 38 which is swively mounted on the frame 34. The traction wheels 36 are driven respectively by a pair of electric stepper motors 40 whose output shafts 42 drive wheels 36 by means of a drive belt 44. Stepper motors 40 are independently controllable, allowing the drive wheels 36 to steer the transporter both forwardly and rearwardly through the cavity 28.

As will be discussed later in more detail, the transporter 32 may be used to carry inspection equipment through the cavity 28, or to push a later discussed positioner through the cavity 28 on which the inspection equipment is mounted. As shown in FIG. 4, a laser scanner 46 is rotatably mounted at 37 on one end of the frame 34 and is connected with a central motor 35 that rotates the laser scanner 46 inside the cavity 28. FIG. 5 shows the use of a camera 48 mounted on one end of the frame 34, which is used to image structural features within the cavity 28.

FIG. 6 shows another embodiment of the transporter 32 in which a hitch 52 is mounted on one end of the frame 34 and includes a clevis 54 for releasably connecting the positioner 56 of the invention to the transporter 32.

As shown in FIG. 7, the inspection equipment positioner 56 includes a central shaft 68 connected with the hitch 52 so that the transporter pushes the positioner 56 through the cavity 28.

Figure 8:
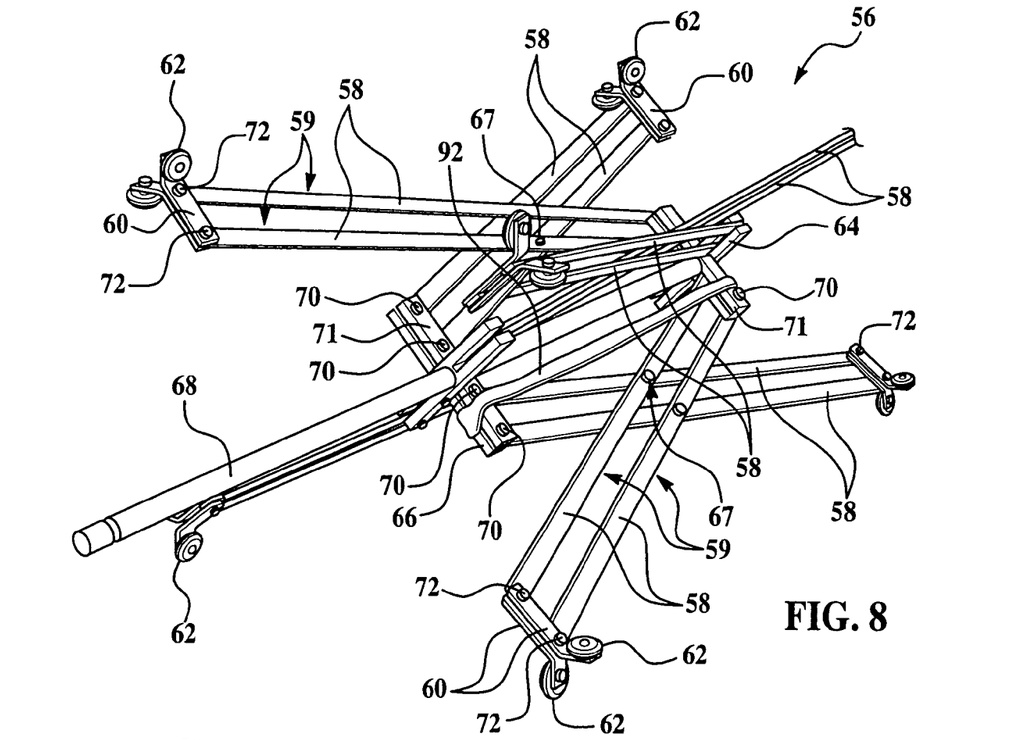
FIG. 8 is a perspective view of the positioner forming one embodiment of the invention.
Figure 9:
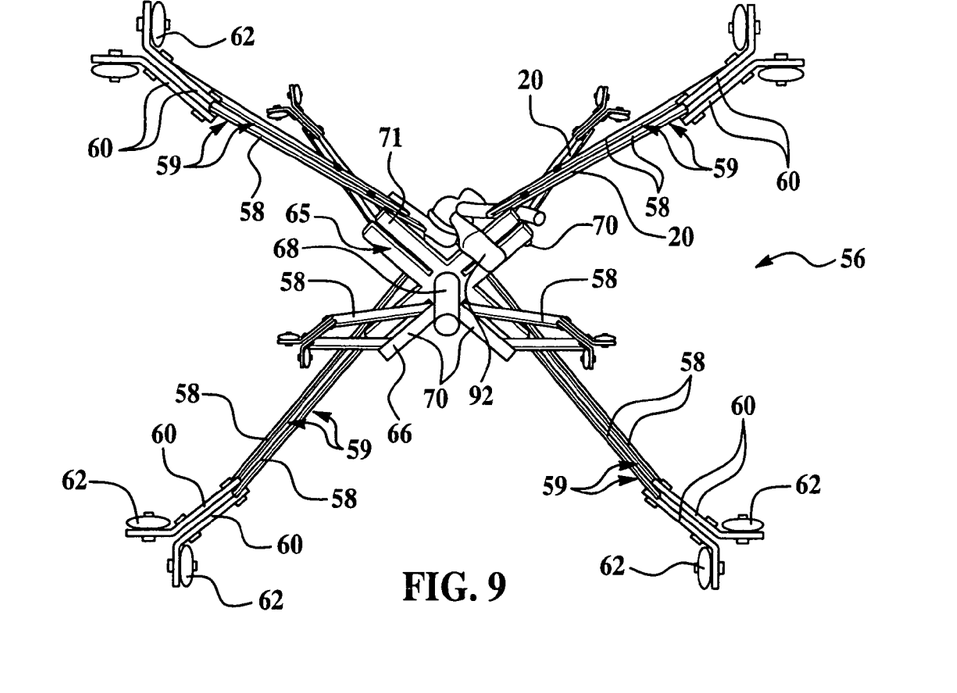
FIG. 9 is a perspective view of one end of the positioner shown in FIG. 8.

Referring concurrently to FIGS. 7-9, the positioner 56 broadly comprises a central hub assembly 65 on which there is pivotally mounted eight extendible arms 58 arranged in four pairs 59, wherein each pair 59 is pivotally connected to form a mechanism with a scissors-like motion. The pairs 59 of arms 58 may extend diagonally outward from the central hub assembly 65, toward the corners of the cavity 28. More specifically, the central hub assembly 65 comprises a central rigid shaft 68 on which there is mounted a pair of cross beam supports 64, 66 having legs 71 that extend radially outward from the shaft 68. Cross beam support 64 is attached to one end of the shaft 68, while the other cross beam support 66 is slidable on the shaft 68, toward and away from cross beam support 64. A biasing means, in the form of an elastic band 92, may be trained around facing legs 71 of supports 64, 66 and functions to bias support 66 toward support 64. Various other means for producing the biasing force may be used, including one or more springs, pneumatic actuators or other forms of force applying mechanisms.

Figure 10:
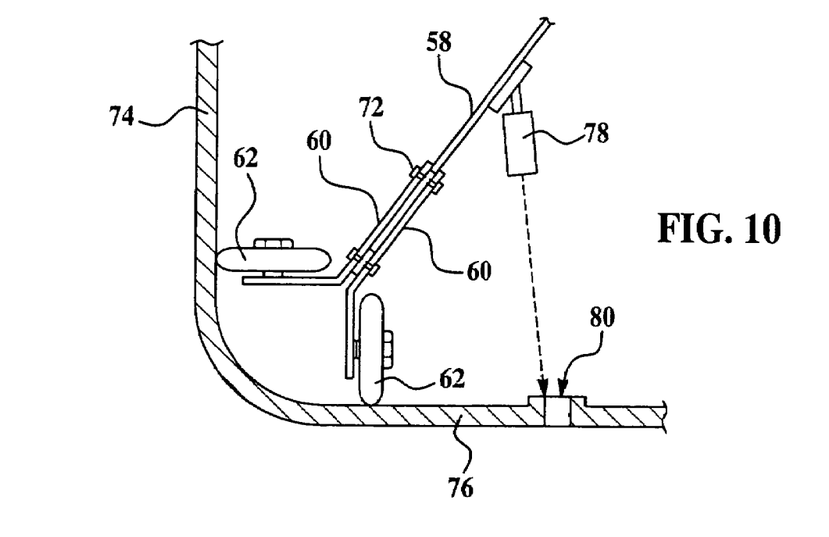
FIG. 10 is an enlarged, fragmentary view of one corner of a cavity of the multi-spar box shown in FIG. 1, and depicting the end of one of the positioner arms engaging the walls of the cavity.

Each of the arms 58 has its inner end connected to a leg 71 of a cross beam support 64, 66 at a pivot point 70. The outer ends of arm member 58 in each pair 59 thereof are pivotally connected by a pair of parallel links 60 at pivot points 72. Medial portions of the arm members 58 in each pair 59 thereof are pivotally connected with each other at pivot points 67. Thus, it can be appreciated that each pair 59 of the arms 58, the legs 71 of the supports 64, 66 and links 60, comprises an assembly that roughly approximates a parallelogram in configuration. The outer ends of links 60 angle outwardly to form a ninety degree angle with respect to each other and have mounted thereon a wheel or roller 62 which, as shown in FIG. 10, is intended to engage a corresponding wall 24, 26 of the walled cavity 28.

In use, the transporter 32 pushes the positioner 56 into and through the cavity 28, acting under remote control. As the positioner 56 enters the cavity, the biasing means, in this example elastic member 92, urges support 66 to slide on shaft 68 toward support 64. The linear motion of support 66 may translate to each pair 59 of arms 58, causing arm members 58 to move outwardly until the wheels 62 engage walls 22, 24, 26 in cavity 28. The biasing means 92 urges the wheels 62 into contact with the walls 22, 24, 26 so as to maintain contact, preferably constant contact, therewith. As the cross sectional dimensions of the cavity 28 change, the arms 58 may either extend further outwards, or move inward. As the arms 58 overcome the force of the biasing means 92, support 66 is caused to slide on shaft 68, away from support 64. When the diagonally extending pairs 59 of arms 58 contact two walls defining a corner of the cavity 28, the central hub assembly 65, and the shaft 68 remain within a central region of the cavity 28. Thus, an inspection device mounted on the shaft 68 remains in the central region within the cavity 28, even though the walls of the cavity may converge or diverge.

Figure 12:
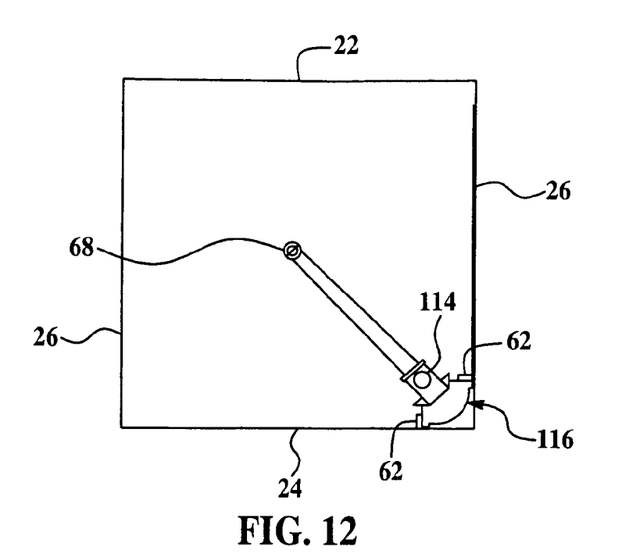
FIG. 12 is a cross sectional view of one of the cavities in the box shown in FIG. 1 and depicting a corner inspection device carried on a positioner arm.

Any of numerous inspection devices of the type previously mentioned may be mounted on the shaft 68, as described above. However, one or more inspection devices may also be mounted on the arms 58, depending upon the feature that is to be measured or inspected. For example, as shown in FIG. 10, a non-contact measurement device 78 such as a camera or laser may be mounted on arm member 58 and is used to inspect the size or location of a through hole 80 in cavity wall 76. Similarly, as shown in FIG. 12, a laser inspection device 114 may be mounted either on arm members 58 or links 60 when it may necessary to measure the radius of a corner 116. Finally, at least one arm 58 may be replaced by an inspection device (not shown) which is mounted on the shaft 68.

Figure 11:
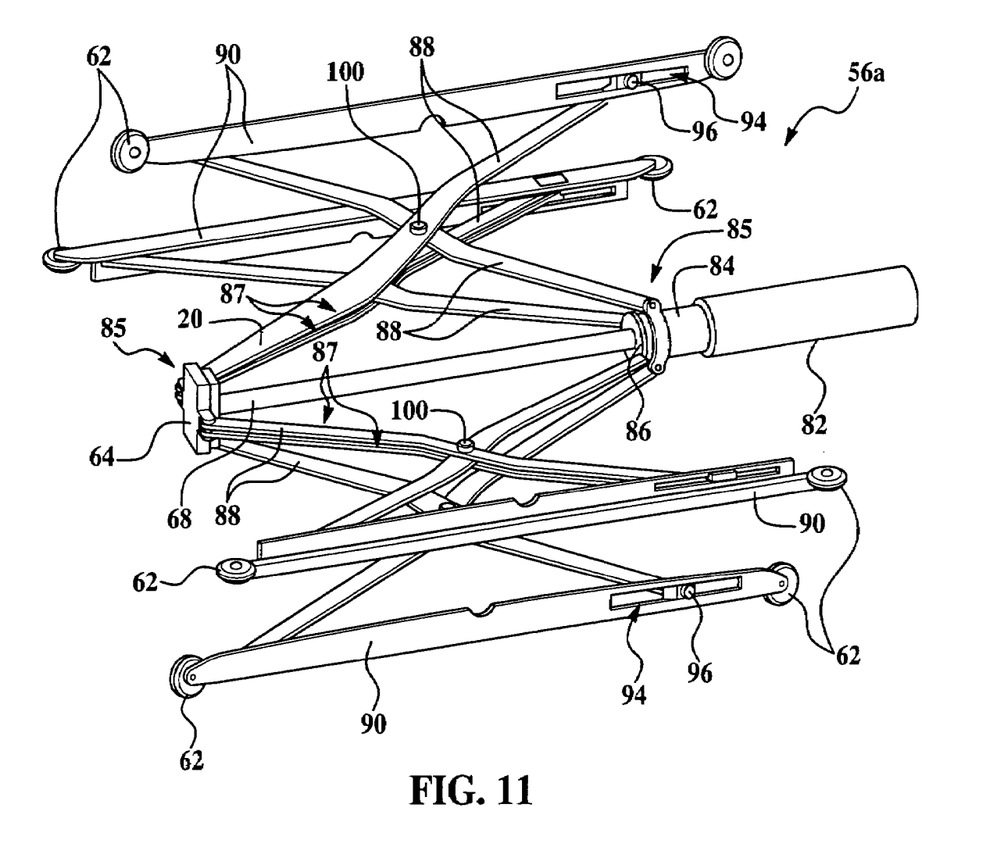
FIG. 11 is a perspective view of a positioner forming another embodiment of the invention using a pneumatic rather than spring loading mechanism.

Attention is now directed to FIG. 11, in which an alternate form of the positioner 56a is shown. Positioner 56a includes a central hub assembly 85 comprising a central shaft 68 having a support 64 attached to one end thereof. A cylindrical support 84 may slide on the opposite end of the shaft 68. The shaft 68 may be connected to a pneumatic cylinder assembly 82 which linearly displaces the shaft 68, causing the latter to slide through support 84. Linear displacement of shaft 68 likewise displaces support 64. Connected between support 64 and support 84 and 86, may be four pairs 87 of arms 88 extending diagonally from shaft 68 and pivotally connected at their medial sections at a pivot point 100. The outer ends of arms 88 are connected by links 90 having rollers 62 on its opposite ends. The links 90 each include a slot 94 receiving a guide pin 96 on the outer end of one of the arms 88. In effect, the slot 94 and pin 96 form a lost motion mechanism so that the wheel 62 on each link 90 remains in contact with a cavity wall 22, 24, 26 as transporter 32 traverses the cavity 28, regardless of changes in the distance between the walls.

In use, the pneumatic cylinder 82 applies a retraction force to shaft 68, thereby biasing support 64 to move toward the right as viewed in FIG. 11. As support 64 retracts toward support 84, the outer ends of the arms 88 move toward each other, forcing the links 90 outwardly so that the wheels 62 may be urged against the cavity walls 28. The force applied by the pneumatic cylinder 82 is selected such that the arm members 88 can collapse, at least partially. Collapsing of the arm members 58 accommodates narrowing distances between the cavity walls 28, which force the links 90 inwardly, toward the central hub assembly 95. As previously mentioned, the combination of the slots 94 and pins 96 assure that both rollers 62 on each link 90 remain in contact with a cavity wall.

Figure 13:
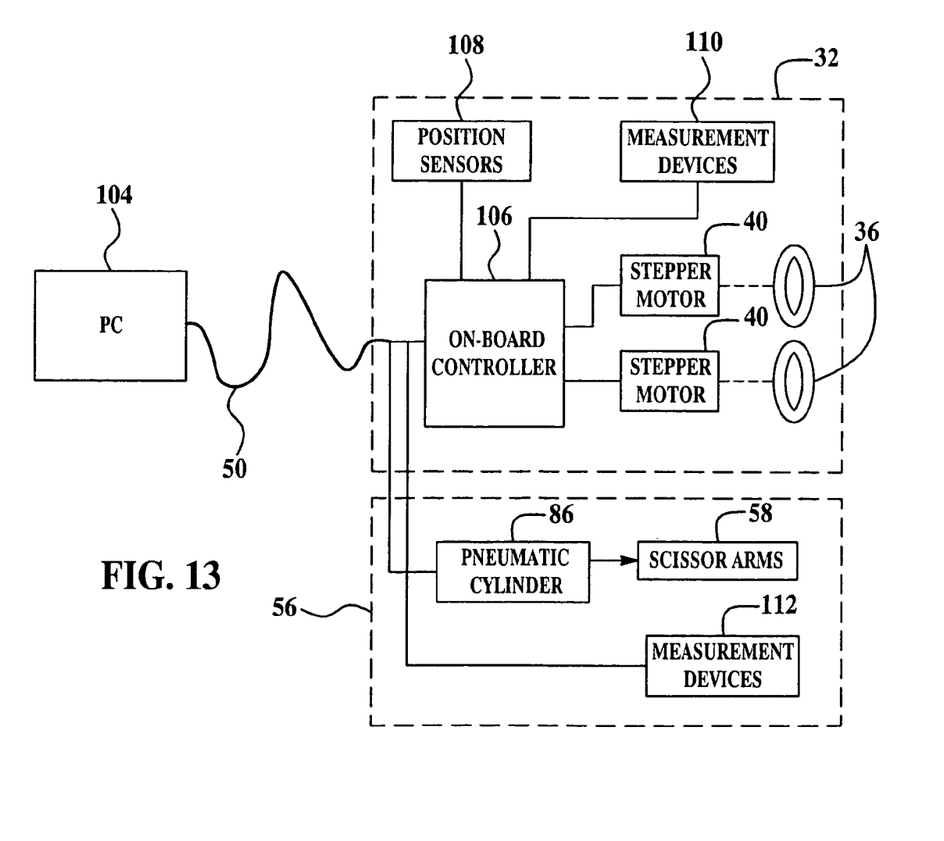
FIG. 13 is a block diagram of a system for controlling the transporter and positioner of the invention.

Attention is now directed to FIG. 13 which depicts a system for controlling the transporter 32 and the positioner 56. Broadly, the transporter 32 comprises an onboard controller 106 which may include a microprocessor controller, for example and appropriate programmed instructions and/or firmware for controlling stepper motors 40 which drive the traction wheels 36. The position of the transporter 32 within the cavity 28 may be controlled by the controller 106, since the location of the transporter 32 is a function of the rotation of stepper motors 40. A flexible conduit 50 connects a stationary PC (personal computer) 104, located outside the cavity 28 with both the transporter 32 and positioner 56. The conduit 50 may house both electrical and pneumatic lines. The controller 106 may route signals from position sensors 108 or measurement devices 110 from the transporter 32 back to the PC 104.

The PC 104 may be used to control the pneumatic cylinder 86 on positioner 56 in order to control the force applied to the arms. Signals from measurements devices 112 carried on the positioner 56 may be relayed through the PC 104 via the tether 50.

Although this invention has been described with respect to certain exemplary embodiments, it is to be understood that the specific embodiments are for purposes of illustration and not limitation, as other variations will occur to those of skill in the art.

What is claimed is:

1. Apparatus for remotely positioning an inspection device within a walled cavity, comprising:
   a frame;
   traction wheels mounted on the frame;
   a source of motive power operatively coupled to the traction wheels;
   a positioner for carrying the inspection device through the cavity, said positioner comprising:
   a central hub assembly coupled with the frame;
   a plurality of extendable arms pivotally coupled with the central hub assembly, said plurality of extendable arms arranged in a plurality of extendable scissor mechanisms wherein a medial portion of one arm crosses and is pivotally connected to a medial portion of another arm, said extendable scissor mechanisms adapted to expand and collapse to maintain contact with walls of said cavity regardless of a changing dimension along a length of said cavity, including cavities comprising a tapering cross section;
   wall engaging members mounted on the arms;
   a biasing means urging the scissor mechanisms outwardly to engage the walls of the cavity.

2. The apparatus of claim 1, wherein the motive power source is an electric motor.

3. The apparatus of claim 1, wherein the hub assembly comprises:
   a shaft,
   a pair of hubs coupled with the shaft, and,
   wherein the arms are pivotally coupled with the hubs.

4. The apparatus of claim 1, wherein the biasing means is coupled connected between the hubs.

5. The apparatus of claim 1, wherein the wall engaging members include rollers.

6. The apparatus of claim 1, where said biasing means and each of said scissor mechanisms are adapted to independently extend to a different length to maintain said wall engaging members in contact with said walls of said cavity.

7. Apparatus for remotely positioning an inspection device within a walled cavity, comprising:
   a positioner for carrying the inspection device through the cavity, said positioner comprising:
   (1) a central hub assembly,
   (2) a plurality of extendable arms pivotally connected to the central hub assembly for supporting and maintaining the hub assembly in a central position within the cavity, said plurality of extendable arms arranged in a plurality of extendable scissor mechanisms wherein a medial portion of one arm crosses and is pivotally connected to a medial portion of another arm, said extendable scissor mechanisms adapted to expand and collapse to maintain contact with walls of said cavity regardless of a changing dimension along a length of said cavity, including cavities comprising a tapering cross section;
   (3) wall engaging members on the arms for engaging walls of the cavity, and,
   (4) biasing means for urging the arms to pivot outwardly toward the walls; and,
   a transporter coupled with the positioner for moving the positioner through the cavity.

8. The apparatus of claim 7, wherein each of the wall engaging members includes at least one roller.

9. The apparatus of claim 7, wherein each of the arms includes a pair of parallel arms comprising first and second sets of links pivotally connected in a parallelogram arrangement.

10. The apparatus of claim 9, wherein each of the wall engaging members includes a pair of rollers respectively engaging adjacent walls of the cavity.

11. The apparatus of claim 7, wherein the central hub assembly comprises:
a shaft;
a first support fixedly connected to the shaft,
a second support slidable along the shaft toward and away from the first support, and
wherein the arms are coupled on the first and second supports.

12. The apparatus of claim 11, wherein the first and second supports each have four of the arms pivotally connected thereto.

13. The apparatus of claim 11, wherein:
the biasing means biases the second support to slide toward the first support, and sliding movement of the second support toward the first support transmits force to the arms causing the arms to pivot outwardly toward the walls.

14. The apparatus of claim 7, wherein each of the plurality of arms comprises a pair of arms arranged in parallel.

15. The apparatus of claim 14, wherein further comprising a link pivotally connecting outer ends of each of the parallel arms.

16. The apparatus of claim 7, wherein the transporter includes a pair of motor propelled traction wheels.

17. The apparatus of claim 7, wherein the hub is coupled with the transporter.

18. The apparatus of claim 7, where said biasing means and each of said scissor mechanisms are adapted to independently extend to a different length to maintain said wall engaging members in contact with said walls of said cavity.

19. Apparatus for carrying an inspection device through a walled cavity, comprising:
a hub assembly;
a plurality of arms pivotally mounted on the hub assembly for supporting the hub assembly in a central position within the cavity, said plurality of arms arranged in a plurality of extendable scissor mechanisms wherein a medial portion of one arm crosses and is pivotally connected to a medial portion of another arm, said extendable scissor mechanisms adapted to expand and collapse to maintain contact with walls of said cavity regardless of a changing dimension along a length of said cavity, including cavities comprising a tapering cross section;
rollers for engaging the cavity walls and allowing the apparatus to roll through the cavity; and,
biasing means for biasing the arms outwardly toward the walls so that the rollers maintain engagement with the walls.

20. The apparatus of claim 19, wherein the hub assembly comprises:
a shaft,
a first support fixed to the shaft,
a second support slidable on the shaft toward and away from the first support, and
wherein the plurality of arms includes a first set of arms carried on the first support and a second set of arms carried on the second support.

21. The apparatus of claim 20, wherein the biasing means includes a fluid driven piston for forcing the first and second supports toward each other.

22. The apparatus of claim 19, wherein the biasing means biases the first and second supports toward each other, forcing the scissor mechanisms to extend outwardly from the hub assembly toward the cavity walls.

23. The apparatus of claim 19, wherein:
the hub assembly comprises:
(1) a shaft,
(2) a first support fixed to the shaft,
(3) a second support slidable on the shaft toward and away from the first support, wherein
(1) said one arm is pivotally connected to the first support, and
(2) said other is pivotally connected to the second support.

24. The apparatus of claim 19, wherein the pivotally connected arms further comprise a link pivotally connecting outer ends of each of the arms.

25. The apparatus of claim 24, wherein each of the links includes a lost motion connection with one of the arms.

26. The apparatus of claim 19, where said biasing means and each of said scissor mechanisms are adapted to independently extend to a different length to maintain said wall engaging members in contact with said walls of said cavity.

27. Apparatus for moving an inspection device through a walled cavity, comprising:
a central support;
a plurality of extendable arm assemblies carried on the support for maintaining the support centered within the cavity, each of the arm assemblies including an outer end for engaging a wall of the cavity, said plurality of extendable arm assemblies arranged in a plurality of extendable scissor mechanisms wherein a medial portion of one arm assembly crosses and is pivotally connected to a medial portion of another arm assembly, said extendable scissor mechanisms adapted to expand and collapse to maintain contact with walls of said cavity regardless of a changing dimension along a length of said cavity, including cavities comprising a tapering cross section; and,
biasing means for biasing the outer ends of the arms against the cavity walls.

28. The apparatus of claim 27, wherein each of the arm assemblies includes at least one roller for engaging and rolling along a wall of the cavity.

29. The apparatus of claim 27, wherein the central support comprises:
a shaft,
first and second supports carried on the shaft for relative movement toward and away from each other, and
wherein each of the pairs of arm assemblies is pivotally connected to the first and second supports.

30. The apparatus of claim 29, wherein the biasing means includes a pneumatic piston for driving the first support toward the second support.

31. The apparatus of claim 27, further comprising a remotely controlled transporter having motor driven wheels, the transporter being connected to the combination of the central support and the arm assemblies.

32. The apparatus of claim 27, wherein the arm assemblies extend diagonally outward from the central support toward corners of the cavity.

33. The apparatus of claim 27, where said biasing means and each of said scissor mechanisms are adapted to independently extend to a different length to maintain said outer ends of the arms in contact with said walls of said cavity.

* * * * *